Sept. 28, 1926.

C. P. WOLFE 1,601,422

THERMOSTATIC REGULATOR

Filed March 21, 1925   2 Sheets-Sheet 1

INVENTOR.
Calvin P. Wolfe
BY
Morsell, Keeney + Morsell.
ATTORNEYS.

Sept. 28, 1926.                                                           1,601,422
C. P. WOLFE
THERMOSTATIC REGULATOR
Filed March 21, 1925          2 Sheets-Sheet 2
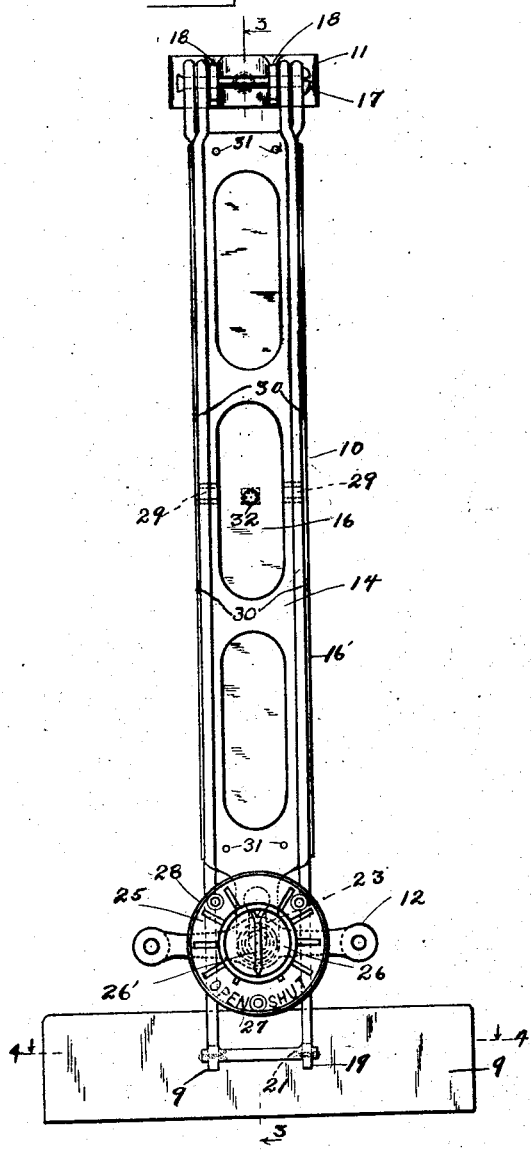
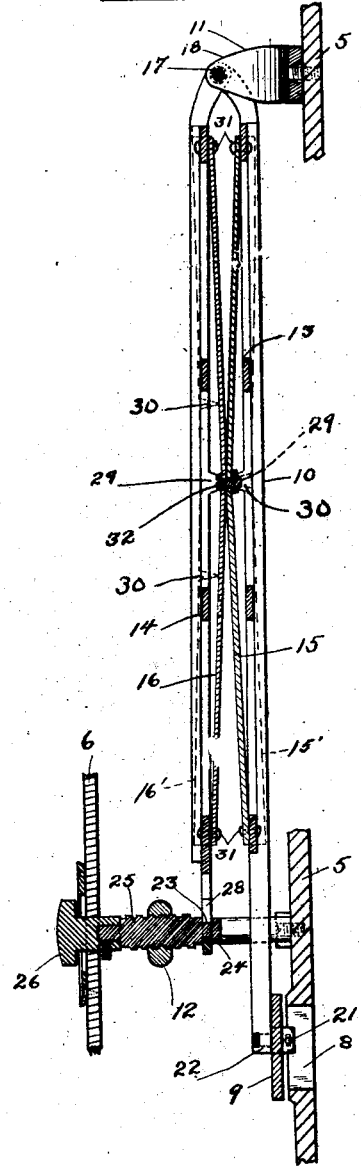
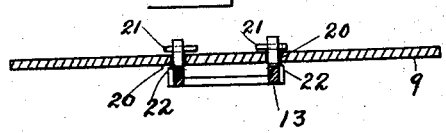
INVENTOR.
Calvin P. Wolfe
BY
Morsell, Keeney & Morsell
ATTORNEYS.

Patented Sept. 28, 1926.

1,601,422

UNITED STATES PATENT OFFICE.

CALVIN P. WOLFE, OF MILWAUKEE, WISCONSIN, ASSIGNOR TO L. J. MUELLER FURNACE CO., OF MILWAUKEE, WISCONSIN, A CORPORATION OF WISCONSIN.

THERMOSTATIC REGULATOR.

Application filed March 21, 1925. Serial No. 17,270.

This invention relates to improvements in thermostatic regulators, more particularly adapted for controlling the temperature of stoves or other heating plants.

It is one of the objects of the present invention to provide a thermostatic regulator for automatically controlling the draft of air to the heater.

A further object of the invention is to provide a thermostatic regulator which will, after the fire has been started, maintain any predetermined temperature desired.

A further object of the invention is to provide a thermostatic regulator which may be easily adjusted exteriorly of the heater to open the draft and also be adjusted to maintain predetermined degrees of temperature desired.

A further object of the invention is to provide a thermostatic regulator which is of simple construction, is strong and durable and is well adapted for the purpose described.

With the above and other objects in view, the invention consists of the improved thermostatic regulator and its parts and combinations as set forth in the claims, and all equivalents thereof.

In the accompanying drawings in which the same reference characters indicate the same parts in all of the views:

Fig. 2 is a front view of the thermostatic regulator, shown on a larger scale;

Fig. 3 is a vertical sectional view taken on line 3—3 of Fig. 2; and

Fig. 4 is a sectional detail view taken on line 4—4 of Fig. 2.

Figure 1:
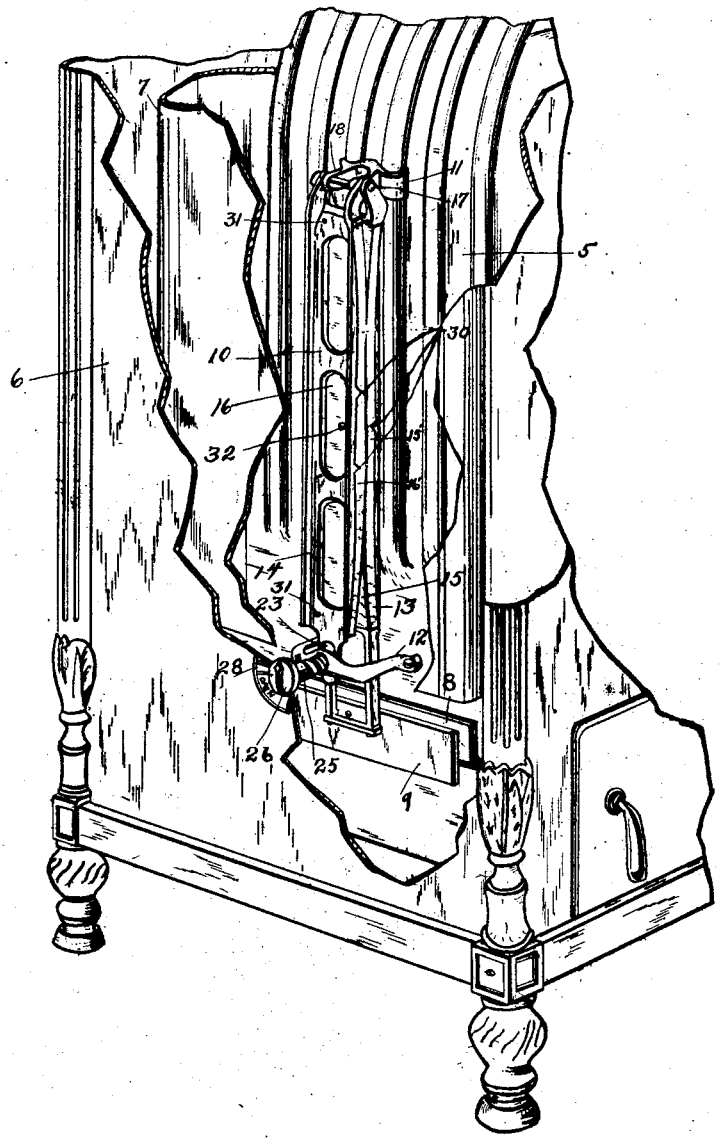
Fig. 1 is a perspective view of a portion of a heater of the cabinet type provided with the improved thermostatic regulator for controlling the draft damper of the heater.

Referring to the drawings, the numeral 5 indicates the heater portion of the cabinet type heater, and 6 the outer casing or cabinet portion thereof. An intermediate casing 7 is also provided to control the circulation of air around the heater. The heater portion is provided with a draft opening 8 in communication with the fire pot thereof and said opening is controlled by a damper 9. The improved thermostatic controller 10 is mounted on the outer side of the heater by an upper bracket 11 and a lower bracket 12 which are bolted to the heater. Said controller comprises a damper lever 13, an adjusting lever 14 and angular expansible members 15 and 16. The damper lever 13 is mounted at its upper outwardly curved end on the pivot pin or bolt 17 which extends through eyed ears 18 projecting from the upper bracket 11. The lower end of the damper lever is formed with inwardly projecting eyed lugs 19 which extend loosely through openings 20 in the damper 9 and the damper is held thereon by cotter pins 21. The lower end of the lever is also formed with shoulders 22 which bear against the outer face of the damper to maintain it loosely in upright position so that when pressed inwardly it will seat against the side of the heater and close off the draft.

The adjusting lever 14 is also pivotally connected at its upper inwardly curved end to the pivot pin 17 and at its lower end the lever is formed with a vertically extending elongated slot or opening 23 to receive the grooved end 24 of the adjusting screw 25. Said adjusting screw 25 is threaded through the medial portion of the lower bracket 12 and its inner grooved end 24, before mentioned, extends through the slot 23 and as the portion of the slot engaged is of less width than the diameter of the screw, the lower end of the lever 14 will be moved inwardly or outwardly when the screw is turned. The screw is provided with a knob or handle 26 which extends through the outer casing and has an arrow 26' indicated thereon which coacts with characters 27 delineated on a dial 28 for convenience in adjusting the screw to give the desired temperature.

The levers 13 and 14 on their adjacent sides and medially of their length are each provided with rounded transverse ribs 29 which bear against the expansion members 15 and 16 mounted on the adjacent sides of the levers. Said expansion members are formed of a metal of greater expansibility than the metal of the levers and are fastened at their opposite end portions to the end portions of the levers by bolts or rivets 31. The medial portions of the expansible members adjacent the transverse ribs 29 are of angular formation and engage each other and are connected together by a bolt 32. The side portions of the expansion members are formed with flanges 15' and 16' to prevent the members from buckling while under strain and are formed with V-shaped edge notches 30 to permit free expansion of the parts. In the outer expansion member the notches are spaced apart, while the inner member has the notches centrally positioned. Said expansion members are preferably formed of any special thermos metal and as their coefficient of expansion is greater than the metal of the levers, they will in expanding bow towards each other and force the inner lever inwardly to close the damper 9, and in contracting, will swing the said lever outwardly to open the damper. As the lower end of the outer lever 14 is adjustably held by the screw 25, all movement caused by the expansible members will be transmitted to the inner lever, while the screw provides a convenient means for manually regulating the damper opening to give the temperature desired.

From the foregoing description, it will be seen that the thermostatic regulator is of very simple construction and is well adapted for the purpose described.

What I claim as my invention is:

1. The combination with a heater having a draft opening, of a regulator therefor, comprising a movable damper for the draft opening, a lever connected at its upper end to the heater and at its lower end to the movable damper, another lever connected at its upper end to the heater, a bracket connected to the heater, a threaded member extending through the bracket above the damper and connected to the lower end of the last mentioned lever to permit positive adjustments in opposite directions to produce predetermined temperatures, and thermostatic plates interposed between and connected together centrally and at their opposite ends to the levers for automatically actuating the damper lever.

2. The combination with a heater having a draft opening, of a regulator therefor, comprising a movable damper for the draft opening, a lever pivotally connected at its upper end to the heater and at its lower end to the movable damper, another lever pivotally connected at its upper end to the heater, a bracket connected to the heater, a threaded member extending through the bracket and connected to the lower end of the last mentioned lever to permit adjustments in opposite direction to produce predetermined temperatures, and thermostatic plates interposed between and connected at their opposite ends to the levers, the medial portions of said plates being connected together but being free from connection with the levers for automatically actuating the damper levers.

3. The combination with a heater having a draft opening, of a regulator therefor, comprising a movable damper for the draft opening, a bracket mounted on the heater, a lever pivoted at its upper end to the bracket and connected at its lower end to the damper, said lever having a medial outwardly extending rib, an expansible plate rigidly connected at its opposite ends to the lever and engaging the rib, another lever pivoted at its upper end to the bracket and having a medial inwardly extending rib and a slot in its lower end portion, a second bracket connected to the heater below the first mentioned bracket, a manually operable member threaded through the bracket and engaging the slot of the lever to positively adjust said levers inwardly or outwardly to produce predetermined temperatures, and an expansible plate positioned between the levers and connected at its opposite ends to the second lever and engaging the rib thereof, said expansible plates being rigidly connected together medially of their length.

4. The combination with a heater having a draft opening, of a regulator therefor, comprising a movable damper for the draft opening, a bracket mounted on the heater and having a pivot pin, a lever pivoted at its upper end to the pin of the bracket and loosely connected at its lower end to the damper, an angular expansible plate rigidly connected at its opposite ends to the lever, another lever pivoted at its upper end to the bracket pin and having a slot in its lower end portion, an angular expansible plate positioned between the lever and rigidly connected at its opposite ends to the second lever and medially of its length connected to the other expansible plate, a second bracket mounted on the heater below the first mentioned bracket, and a screw threaded through the second bracket and having an annular recessed end portion engaging the slotted portion of the lever for positively moving the lever in opposite directions, both of said expansible plates having side flanges extending along the side edges of the levers.

In testimony whereof, I affix my signature.

CALVIN P. WOLFE.